(12) United States Patent
Anderson

(10) Patent No.: US 10,219,046 B2
(45) Date of Patent: Feb. 26, 2019

(54) DISTRIBUTION MANAGEMENT FOR MEDIA CONTENT ASSETS

(71) Applicant: Premiere Digital Services, Inc., Los Angeles, CA (US)

(72) Inventor: Erik David Anderson, Highland Park, IL (US)

(73) Assignee: PREMIERE DIGITAL SERVICES, INC., Los Angeles, CA (US)

( * ) Notice: Subject to any disclaimer, the term of this patent is extended or adjusted under 35 U.S.C. 154(b) by 0 days.

(21) Appl. No.: 15/406,311

(22) Filed: Jan. 13, 2017

(65) Prior Publication Data

US 2017/0208367 A1 Jul. 20, 2017

Related U.S. Application Data

(60) Provisional application No. 62/279,575, filed on Jan. 15, 2016.

(51) Int. Cl.

| | |
|---|---|
| H04L 12/28 | (2006.01) |
| H04N 21/658 | (2011.01) |
| G06F 17/30 | (2006.01) |
| G06Q 30/02 | (2012.01) |
| H04N 21/278 | (2011.01) |
| H04N 21/258 | (2011.01) |
| H04N 21/237 | (2011.01) |

(52) U.S. Cl.
CPC ....... *H04N 21/658* (2013.01); *G06F 17/3082* (2013.01); *G06F 17/3084* (2013.01); *G06F 17/30241* (2013.01); *G06F 17/30828* (2013.01); *G06Q 30/0282* (2013.01); *G06Q 30/0283* (2013.01); *H04N 21/237* (2013.01); *H04N 21/25841* (2013.01); *H04N 21/278* (2013.01); *H04L 12/2874* (2013.01)

(58) Field of Classification Search
CPC .................................................. H04L 12/2874
See application file for complete search history.

(56) References Cited

U.S. PATENT DOCUMENTS

2005/0246156 A1* 11/2005 Scanlan ................ G06F 17/289
704/2
2013/0268312 A1* 10/2013 Sharma .............. G06Q 30/0611
705/7.26

* cited by examiner

*Primary Examiner* — Michael H Hong
(74) *Attorney, Agent, or Firm* — Gates & Cooper LLP

(57) ABSTRACT

A method, system, and framework provide the ability to distribute media content. Title information for a media asset is acquired into a computer database. Distribution requirements (e.g., file requirements for files required to distribute the media asset) for retailers and territories are maintained in the database. Desired retailers are selected. Based on the title information and the desired retailers, territories with distribution requirements that match the title information are automatically selected. File requirements for the selected desired retailers and selected territories are displayed. An order is created (the order is based on the title information, the selected desired retailers, the selected territories, and the file requirements). Files identified by the file requirements are received. Based on the order, the received files are automatically submitted (for distribution of the media asset) to the selected retailers.

18 Claims, 6 Drawing Sheets

FIG. 6

DISTRIBUTION MANAGEMENT FOR MEDIA CONTENT ASSETS

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 62/279,575, filed on Jan. 15, 2016, with inventor(s) Erik David Anderson, entitled "Distribution Management for Media Content Assets."

BACKGROUND OF THE INVENTION

1. Field of the Invention

The present invention relates generally to media content, and in particular, to a method, apparatus, system, and article of manufacture for managing the distribution of digital media content assets.

2. Description of the Related Art

Media content developers/producers such as filmmakers, episodic producers/directors, etc. often create media content assets (e.g., a film/movie, short, episodic, etc.). Such developers desire to distribute the media content assets via as many different distribution outlets/platforms/retailers as possible. For example, a developer may desire to publish/distribute a film via one or more of the following distribution platforms/retailers: AMAZON, COMCAST INFINITY, DISH, FANDOR, GOOGLE PLAY, HOOPLA, HULU, INDEMAND, ITUNES, MICROSOFT, NETFLIX, NOOK, SONY ENTERTINAMENT NETWORK, VUBIQUITY, VULU, etc. However, while the developers may be excellent producers/directors/editors, they often do not have the knowledge base regarding how such a media distribution platform/retailer works, the requirements for content on such a platform/retailer, and/or how to manage the media content on such a platform/retailer. Thus, there is a need for a method and system that manages/assists media content developers/producers with the distribution of their content.

SUMMARY OF THE INVENTION

Embodiments of the invention overcome the problems of the prior art by providing a system that enables any person with the ability to distribute media content assets such as a film, short, movie, episodic, etc.

On a server, a rule engine manages rules for each retailer/platform that specifies all of the requirements and data necessary to distribute media content.

The server further provides a graphical user interface (to a client/user) that guides a client/user through the distribution process while ensuring compliance with the rules set forth in the rules engine. The user interface enables a distribution process that consists of a series of simple steps that assists/enables the user to manage the distribution of media content assets.

BRIEF DESCRIPTION OF THE DRAWINGS

Referring now to the drawings in which like reference numbers represent corresponding parts throughout:

FIG. 6 illustrates an exemplary graphical user interface for a pricing time-saving tool in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide the ability to streamline the management of the distribution of media content assets via multiple online platforms/retailers. From a user/client perspective, the process consists of eight (8) simple steps: (1) entering basic title information; (2) choosing retailers; (3) choosing territories; (4) file requirements; (5) choosing a payment plan; (6) order review; (7) contract agreement; and (8) payment information. Each of the steps is managed via a server application that controls/manages the distribution process via a consolidated rule set.

Hardware Environment

Figure 1:
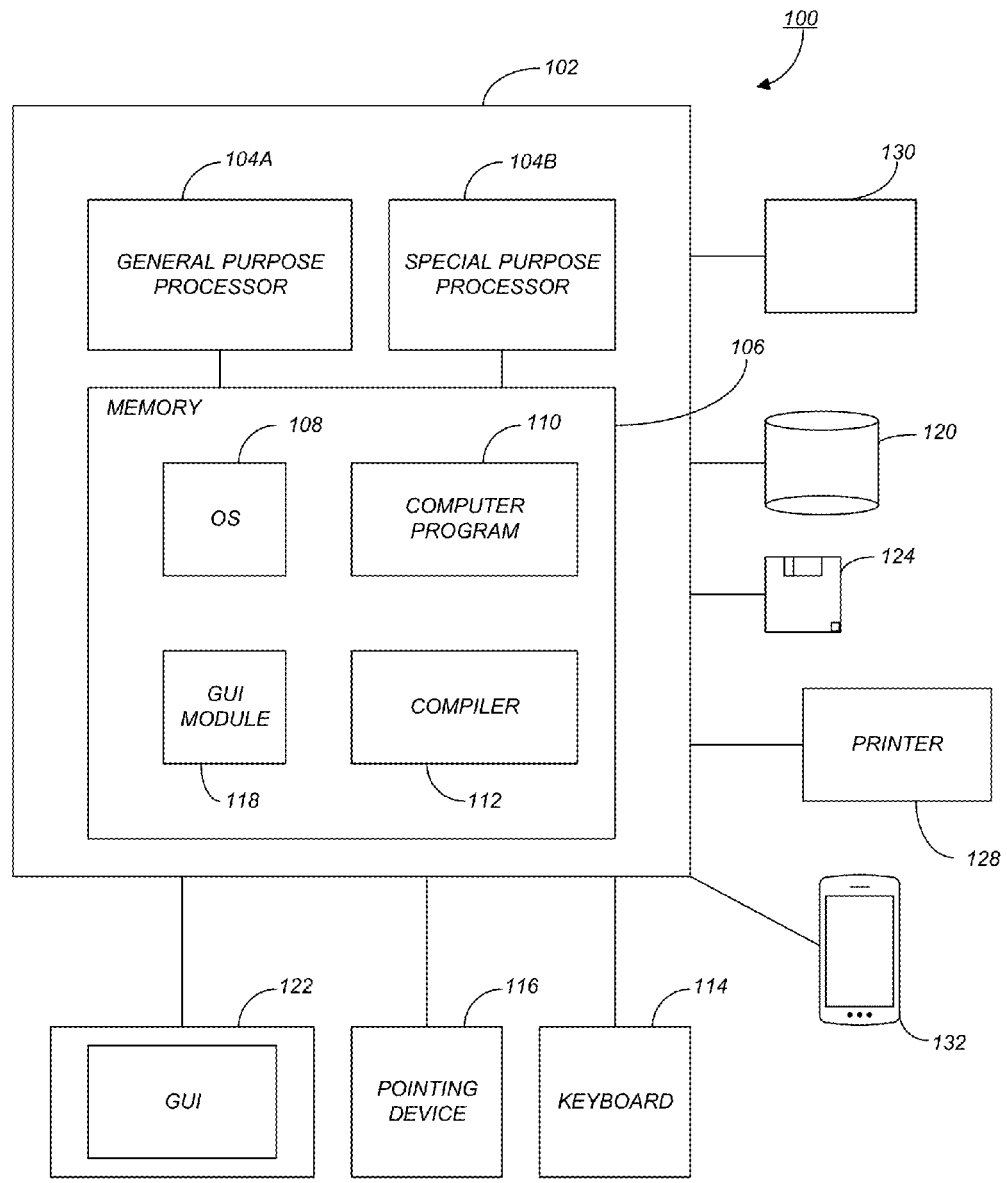
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, IPOD, NOOK, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, XBOX ONE, PLAYSTATION IV, WII U, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as C, C++, Assembly, SQL, PYTHON, PROLOG, MATLAB, RUBY, RAILS, HASKELL, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
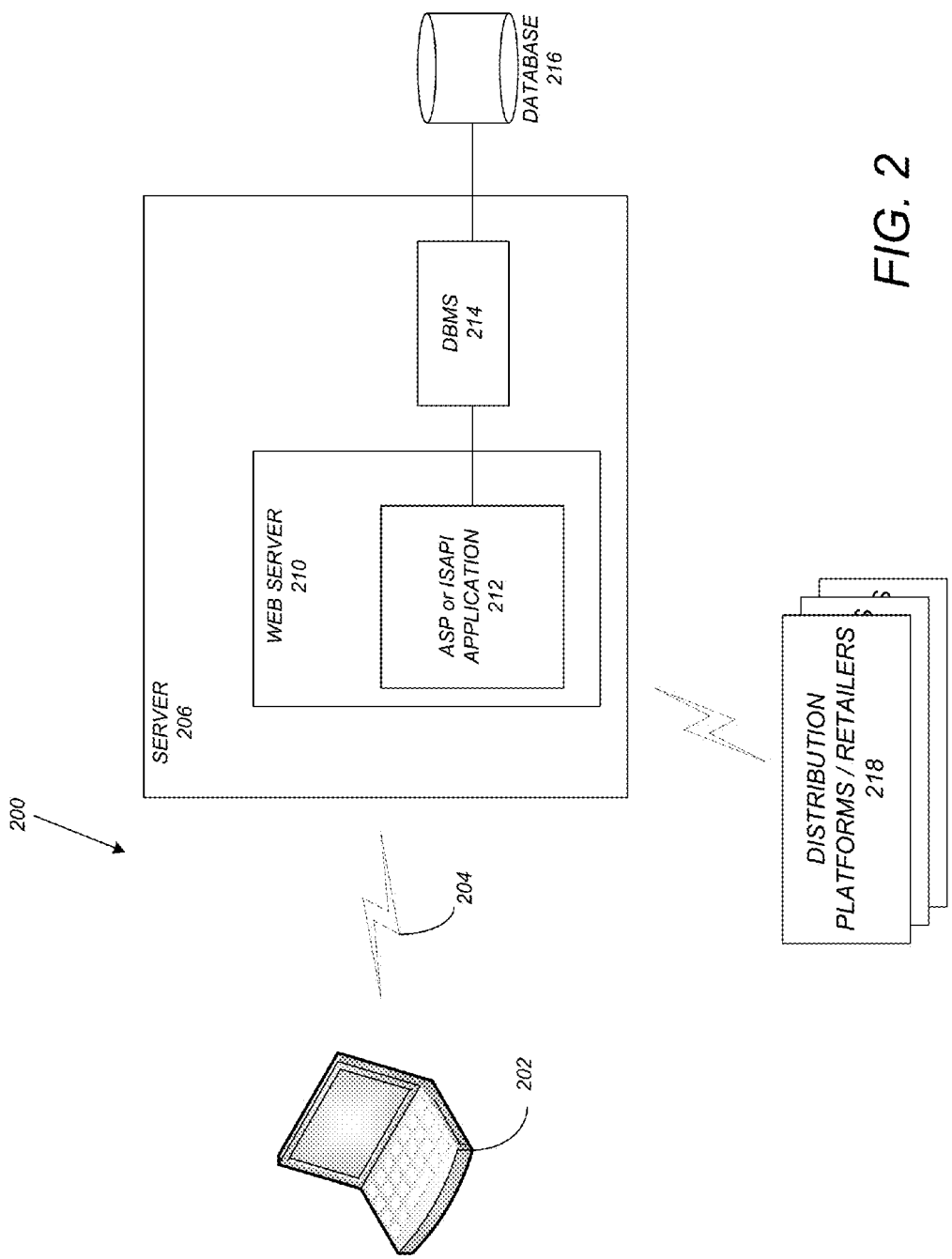
FIG. 2 schematically illustrates a typical distributed/cloud-based computer system using a network to connect client computers to server computers in accordance with one or more embodiments of the invention.

FIG. 2 schematically illustrates a typical distributed/cloud-based computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Further, in a cloud-based computing system, resources (e.g., storage, processors, applications, memory, infrastructure, etc.) in clients 202 and server computers 206 may be shared by clients 202, server computers 206, and users across one or more networks. Resources may be shared by multiple users and can be dynamically reallocated per demand. In this regard, cloud computing may be referred to as a model for enabling access to a shared pool of configurable computing resources.

Clients 202 may execute a client application or web browser and communicate with server computers 206 executing web servers 210. Such a web browser is typically a program such as MICROSOFT INTERNET EXPLORER, MOZILLA FIREFOX, OPERA, APPLE SAFARI, GOOGLE CHROME, etc. Further, the software executing on clients 202 may be downloaded from server computer 206 to client computers 202 and installed as a plug-in or ACTIVEX control of a web browser. Accordingly, clients 202 may utilize ACTIVEX components/component object model (COM) or distributed COM (DCOM) components to provide a user interface on a display of client 202. The web server 210 is typically a program such as MICROSOFT'S INTERNET INFORMATION SERVER.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S TRANSACTION SERVER (MTS) to access required data stored in database 216 via an interface such as ADO (Active Data Objects), OLE DB (Object Linking and Embedding Data-Base), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Software Embodiment Overview

Embodiments of the invention are implemented as a software application on a client 202 or server computer 206. Further, as described above, the client 202 or server computer 206 may comprise a thin client device or a portable device that has a multi-touch-based display. The client 202 may be executing an application (or app) on a thin client device. In addition, the server 206 may provide a web-based application that manages the media content assets that may be stored in database 216. The rule-set for managing the distribution of the media content assets may also be stored in database 216. As described herein, client 202 may comprise a developer client 202 that has created/developed or is responsible for distributing media content assets. In addition, server 206 interacts with distribution platforms/retailers 218. Such distribution platforms/retailers 218 may also be viewed as clients 202 and may be configured with the same hardware/software as clients 202 and/or server 206.

Software Embodiment Details

Embodiments of the invention provide the ability for a client/user 202 to facilitate and manage the distribution of a media content asset on multiple distribution platforms/retailers 218.

Logical Flow

Figure 3:
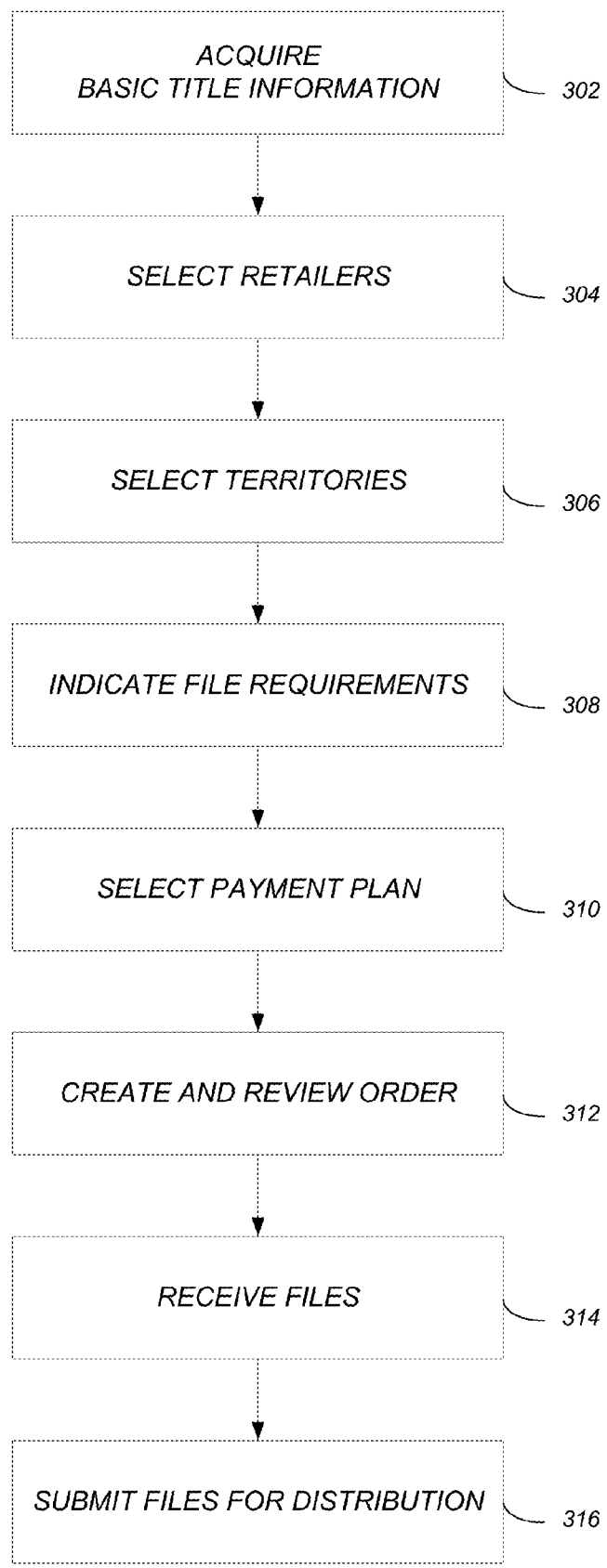
FIG. 3 illustrates the logical flow for providing a direct distribution platform for media content in accordance with one or more embodiments of the invention.

FIG. 3 illustrates the logical flow for providing a direct distribution platform for media content in accordance with one or more embodiments of the invention.

At step 302, basic title information (e.g., title, runtime information, release year, and original spoken language of the media asset) for the media asset/content is acquired/entered (e.g., via a user and/or automatically determined/received). Such basic title information is acquired/stored in database 216. Further, the database is also used to maintain distribution requirements for one or more retailers and one or more territories. Such distribution requirements include one or more file requirements for files required to distribute the media asset.

At step 304, the desired retailers that the media asset/content owner desires to distribute the content are selected/determined (e.g., from a list of retailers).

At step 306, territories that the owner desires to distribute the content to are selected/determined. Such a step 306 may include the automatic and dynamic (e.g., without additional user interaction) selection of the territories that have distribution requirements that match/correspond the title information. In one or more embodiments, the title information may include languages of the files that are to be included in the order. Thereafter, when selecting the territories in step 306, the territories with language requirements that match the languages of the files to be included in the order, are automatically (e.g., without additional user input) selected. In further embodiments, additional languages may be interactively and iteratively added, resulting in the automatic selection of additional territories with language requirements that match the additional languages.

As described in further detail below, various tools may be used to overcome various problems in the prior art. For example, it would be practically impossible to manually input certain information for multiple platforms/retailers 218 when attempting to distribute a media asset. Accordingly, one tool is that of a date tool. Using a date tool, date information for sales and/or rental of the media asset is entered/received. Thereafter, the date information is applied to all of the territories automatically. Another tool is a pricing tool where a currency and retail pricing information are selected/acquired. Based on the currency, the retail pricing information is automatically and dynamically converted into all other currencies as required by the selected territories. In yet one more tool, a ratings tool accepts ratings information for the media asset. The ratings tool then instantiates retailer fields with the ratings information for all of the desired retailers (i.e., that require the ratings information).

Territories may also be removed as desired. Once determining that a territory should be removed, embodiments of the invention automatically remove the territory as well as files that correspond to only the removed territory (e.g., if the files are also used by other territories, they would remain as part of the selection).

At step 308, the requirements for the files based on the selections in steps 304 and 306 are indicated/provided/displayed (e.g., based on the desired retailers and selected territories). Step 308 may further include interactively indicating whether one of the files is available, is not available, or should be automatically created.

At step 310, a payment plan/structure is selected. Such a step may also include the receipt/entry of payment information associated with the order/submission of the order.

At step 312, the order is created and then presented/displayed for review and confirmation. The order is based on the title information, the selected desired retailers, the selected territories, and the file requirements. The review/confirmation displays a summary of the desired retailers, selected territories, and the file requirements.

At step 314, the files identified by the file requirements are received. Further, in embodiments of the invention step 314 includes the execution of a contract agreement. As described below, such a single contract agreement may be automatically and dynamically (e.g., without additional user input) created/compiled from provisions for each of the selected desired retailers. In other words, contract provisions/terms required by each of the selected retailers may be used to compile a single contract agreement that is confirmed (e.g., interactively with the user).

At step 316, based on the order, the received files are automatically submitted in order to distribute the media asset via the selected retailers in the selected territories.

Each of the steps 302-316 are managed via a server application that controls/manages the distribution process via a consolidated rule set.

Order Placement Details

Figure 4:
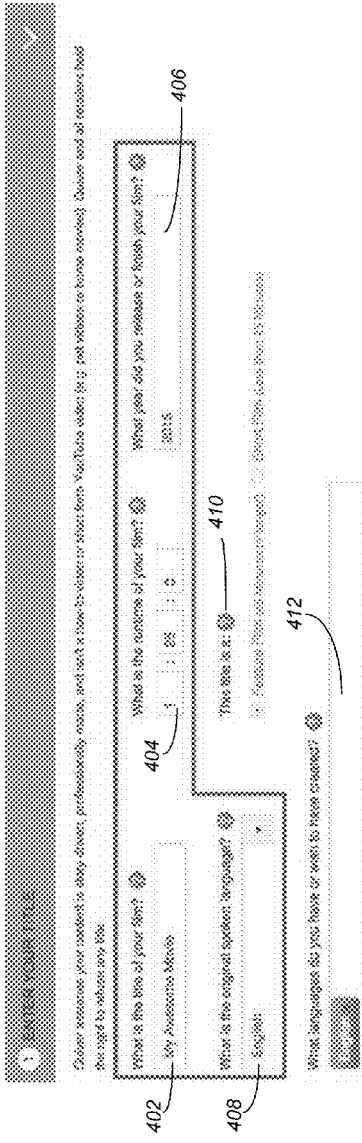
FIG. 4 illustrates an exemplary graphical user interface for entering basic title information in accordance with one or more embodiments of the invention.

Once a user has become a registered user/client, he/she may opt to begin the creation/placement of an order to distribute a media content asset. The first step is that of entering basic title information (step 302). FIG. 4 illustrates an exemplary graphical user interface for entering basic title information in accordance with one or more embodiments of the invention. Such basic title information may include the title 402 (e.g., the title as the owner would like it to appear on storefronts), the run time 404, the year 406 of release/when the asset was finished, the original spoken language 408, etc. From the basic title information, other information may be known or may be automatically detected. In this regard, internal logic and/or a set of rules may be used to automatically determine and enter/update basic title information based on information that is input. For example, after entering a runtime 404, embodiments of the invention may utilize a rule set/internal logic to automatically and dynamically determine/detect and update whether the title/asset is a feature film or a short film 410. The basic title information may also indicate any additional languages 412 that have been or may be created for the asset (e.g., French, Spanish, etc.). Hovering (e.g., over a question mark icon) adjacent a field may display a window with definitions, explanations, or suggested actions.

The next step of the process, step 304, is that of selecting/choosing the retailers/platforms 218. The list of available retailers/platforms may be based on the basic title information (e.g., language and runtime). In other words, certain retailers/platforms 218 may not be available for selection based on the language identified in Step 302. The selection process may include displaying various icons representative of the various retailers/platforms 218. For ease of use, the list of selectable retailers/platforms 218 may be displayed in a grey tone, and once selected, may be highlighted and displayed in color. Accordingly, those retailers 218 not selected may remain greyed out and are not included in the order or for further processing. Retailers/platforms 218 may be open retailers (accepts any title as long as the file associated with the title meet the retailer's specifications) or curated retailers (requires a title to be "pitched" to the retailer who retains the right to refuse any title). Upon selecting a specific platform/retailer 218, information about the requirements/rules for the selected platform/retailer 218 may be displayed for the user's review. For example, clicking a curated retailer's icon may open a new dialog box with a brief explanation about what the retailer is looking for in content (e.g., the minimum content requirements and information about what that particular retailer typically accepts as content [e.g., same release date as DVD or theatrical release, film released in a major festival, etc.]). In this regard, when creating and submitting a "pitch", the curated retailers may require some additional information about the title that is unique to the pitch process (e.g., box office numbers, trailer link, screener link, total sales to date, film festivals, Kickstarter numbers, press links, etc.). Further, after submitting a pitch, once approved by a curated retailer for delivery, embodiments of the invention may then request/create an additional order to deliver files and metadata for the title to the curated retailer.

Step 306 of the process enables the selection of territories. Default/automated territory selection may be based on the basic title information (e.g., all territories with language requirements that match the languages included in the order). In this regard, a list of territories may be automatically and dynamically generated/selected based on the selections set forth in Steps 302 and 304. Further, if a new territory is selected that requires a language that was not previously selected (e.g., Mexico is selected as a territory which has a requirement for Spanish), the user may be prompted to add the required language (e.g., to instantly add the language or may direct the user to go back and edit the language selections in step 302). In one or more embodiments, the selections may be displayed by continent with the number of territories selected for each continent displayed to the right of each continent's name (e.g., "North America (⅔ Territories Selected)"). To view a listing of the actual territories selected within each continent selection, a menu option (e.g., selection of an arrow) may be selected/activated. Further, upon selection of a territory, an expanded menu may display the information required for that territory (e.g., including sales EST [electronic sell through] and rental VOD [video on demand] information, as well as the retailers selected in step 304).

Figure 5:
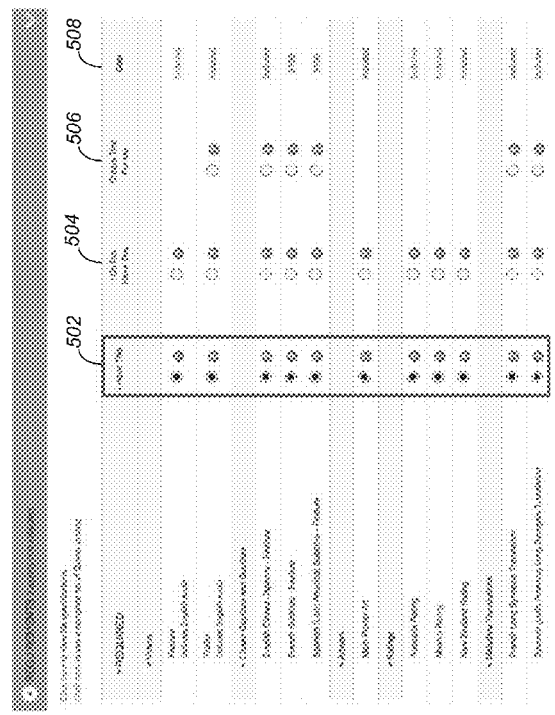
FIG. 5 illustrates an exemplary graphical user interface displaying a listing of the files required based on previously entered selections in accordance with one or more embodiments of the invention.

In step 308, the system indicates the files that are required based on the selections set forth in Steps 302-306. In other words, to process a file, the system needs to know what files to expect, step 308 identifies such files. This step may also provide the option to create a required file if the user doesn't already have such a file (e.g., a trailer, closed captioning, etc.). Based on the various selections/requirements, a running total/cost may be dynamically updated and presented to the user. The user may also opt to remove a particular territory that requires a file (e.g., if the user does not already have the file and/or does not want to have the required file created). FIG. 5 illustrates an exemplary graphical user interface displaying a listing of the files required based on previously entered selections. As illustrated, the user has the option of indicating whether they have the file 502, does not have the file 504, whether the file should be created 506, and any cost associated with the file 508. Note that the total order cost may be updated based on the selections and costs in column 508.

In addition to the above, embodiments of the invention may allow a user to remove territories that require a particular file. In this regard, upon selection (e.g., of a radio button in column 504 that is adjacent a particular required file, a window may be displayed with the on-screen listing of the territories that will be removed from the order if the required file in that row is not included in the order (i.e., is removed). The user may then be presented with the option to remove the listed territories. An additional section (similar to the listing of required files of FIG. 5) may present similar selections for files that are optional.

Step 310 provides the ability to select/choose a payment plan (e.g., the cost the user/client will be required to pay based on the selections in steps 302-308, the recurring costs [e.g., for renewing, the royalties to be paid to the artist, etc.]). Users may also have the ability to review an order breakdown (to view how much each section of the order costs), and/or a pricing breakdown (to see a list of rates for all of the services offered). Step 310 may also provide the ability for the user to enter their payment information (e.g., credit card information or other payment instructions [e.g., wire transfer])

Step 312 provides an additional ability for the actual creation of the order for display and review (e.g., a display of the order break down and how much each section of the order costs) (e.g., generated from the pricing breakdown computed based on step 310). Step 312 may also include the display and confirmation of the contract between the service and the user that allows the service to distribute the title on the user's behalf. The contract may also include respective contract elements/portions from the individual platforms/retailers 218. In other words, the contract presented in step 312 is a combined contract that includes all of the contracts/agreements from the individual platforms/retailers 218. The combined contract may indicate which portions are different for the different platforms/retailers 218. Thus, the combined contract is dynamically generated based on the different selections in prior steps.

Once the order is complete, the files required for the order are received at step 314 (e.g., from a user, pulled or pushed from a database, etc.).

At step 316, the order is submitted (e.g., approved by the user) followed by the actual submission of the files to the various platforms/retailers 218.

Time-Saving Tools

Once an order has been submitted by the user, additional information (e.g., metadata) and files must be received into the service before the order can be placed with the various platforms/retailers 218. In this regard, metadata may include all information that the platforms/retailers 218 require in order to list a title as available for sale and/or rent. Such metadata includes all information that the platforms/retailers 218 require in order to list a title as available for sale and/or rent. Such metadata may be title-related. For example, various fields such as dates (e.g., sales and rental dates), prices, ratings, and remaining fields (e.g., cast/crew, synopsis, etc.) may be required by one or more platforms/retailers 218.

A plethora of time-saving tools may be available to the user to expedite the input/processing of such metadata information. The time-saving tools provide a list of items/information that allows the user to select some fields that will reduce the number of fields that need to be filled in. Such time-saving tools may include "Dates," "Pricing,", and "Ratings."

The Dates time-saving tool allows the user to input sales and rental date information that will be applied to all territories included in the order. Such date information may include the sales pre-order date, sales start date, sales end date, VOD/rental start and end date, AMAZON PRIME start date, HULU preferred start date, etc. Recommended or default dates may be presented for selection based on the system's capabilities and selections previously entered by the user. The date selections may then be used to apply to all the territories rather than requiring separate manual entry (e.g., potentially saving the manual entry of hundreds of fields). In this regard, the system enables the single entry by the user of date information and utilizes such information to automatically insert the appropriate date information when placing orders with the platforms/vendors 218. For example, once the sale-dates information is entered, the user may be provided with the option to review the application of such information to all of the territories (the application of the entered data to x number of territories with a listing of the territories that the data will be applied to). When reviewing such the sale-dates territories option, the user can simply select a particular territory to delete such a territory from the list. Such capability permits single entry by the user that is used in multiple instances across multiple platforms/vendors 218 and multiple territories (i.e., in multiple orders).

Figure 6:
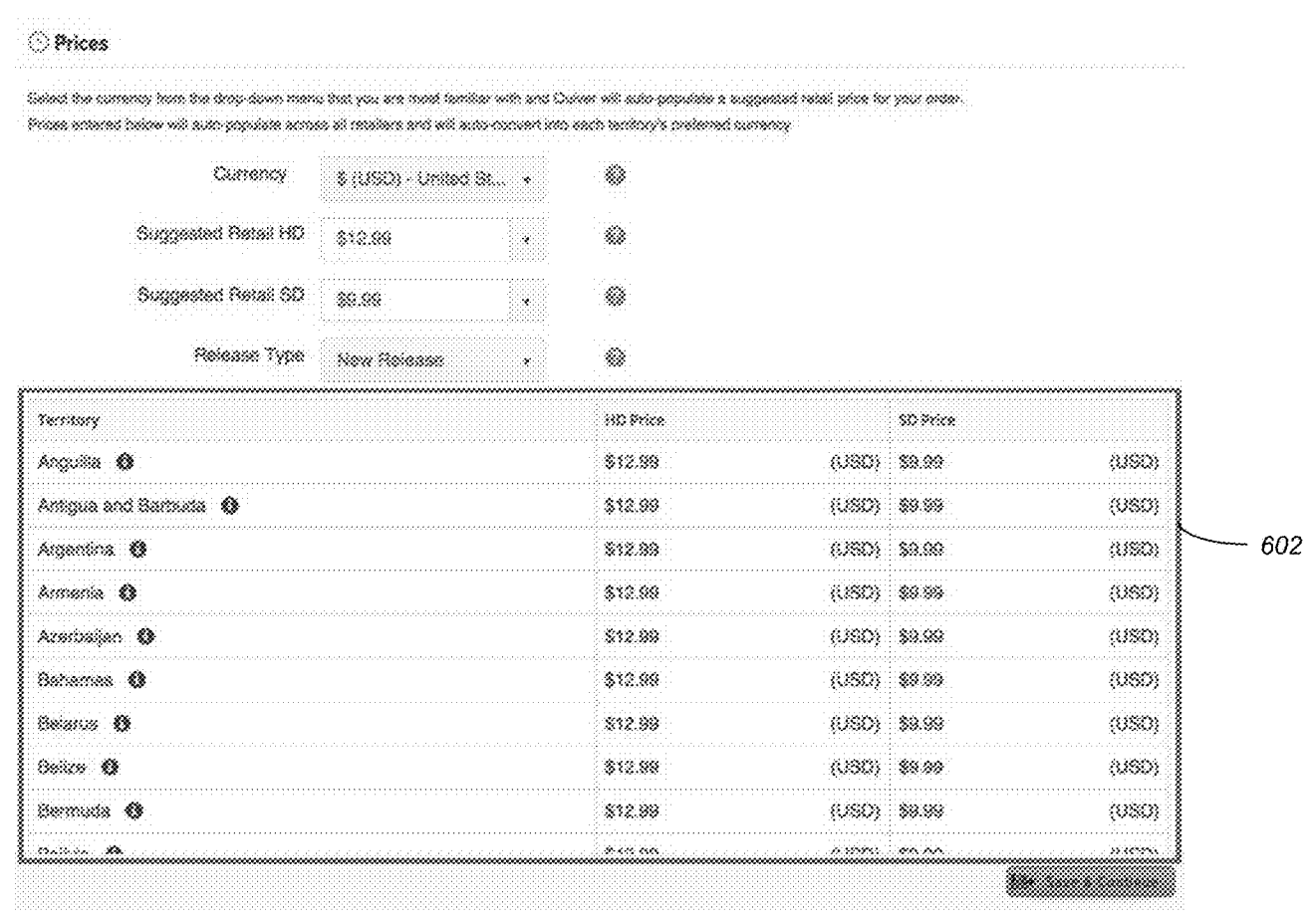

The Pricing time-saving tool permits the user to select the currency, the suggested retail HD (high definition) price, the suggested retail SD (standard definition) price, and the release type (e.g., new release, library, etc.) that will be used across all retailers/platforms 218. The suggestions provide suggested pricing that may be used for the various territories. In this regard, based on the currency selection, embodiments of the invention may automatically and dynamically convert the selected prices into all other currencies required by the different territories in the order. FIG. 6 illustrates an exemplary graphical user interface for the pricing time-saving tool in accordance with one or more embodiments of the invention. As illustrated, once a currency has been selected (e.g., via a drop down menu), the suggested pricing may auto-populate across all retailers and will auto-convert into each territory's preferred currency (see territory area 602).

The Ratings time-saving tool provides the ability for the user to enter ratings information for the asset. In this regard, some territories require an official rating from a territory's ratings board and the user can select the official rating for such a territory. The user can easily specify the various ratings using menu/drop-down selections, and such selections may be used to instantiate the various fields when the orders are actually placed with a platform/retailer 218.

An additional time-saving tool may be used to populate other fields that may be required by one or more territories (e.g., the country of origin, a long synopsis, a short synopsis, a genre, a copyright line, keywords, cast, crew, etc.). The list of additionally required fields is dynamically generated by the rules engine based on title information, selected retailers, territories, and available assets. All fields are mapped and correlated in the background so that the user is presented with the shortest list of required values. For example, six-hundred (600) required values could be reduced to only six (6) fields the user has to fill out. Those six fields are then automatically mapped to the correct retailer/territory/language/content type specific requirement and adjusted to make sure they meet the technical requirements of that specific field (character length, specific genre classification, cast or crew name ordering convention, etc.). To attempt to manually track all of the rules and fields required for 10+ retailers, 5+ languages, and 100+ territories would be impossible to be done manually.

Once the above time-saving tools are used, the user may be presented with an option to customize/set overrides for the metadata for a specific territory and/or platform/retailer 218. For example, a user may make a specific change to a title's metadata for a certain language, territory, and/or retailer. In this manner, the user can provide a unique experience for a media content asset for each platform/territory and/or combination of platform/territory, as desired.

Figure 7:
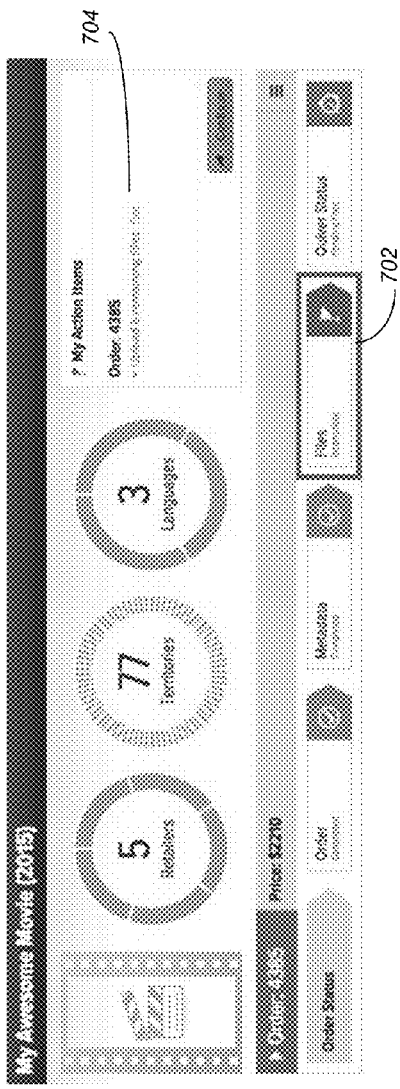
FIG. 7 illustrates an exemplary graphical user interface that indicates processing errors in accordance with one or more embodiments of the invention.

Once the required metadata has been completed (or prior to such completion), the user can begin the process of uploading the required files to the server. A status page may indicate how many files are left to upload for the selected retailers/platforms, territories, and languages. FIG. 7 illustrates an exemplary graphical user interface that indicates an error with respect to the files at 702 as well as an indication regarding how many files are left to upload at 704.

Figure 8:
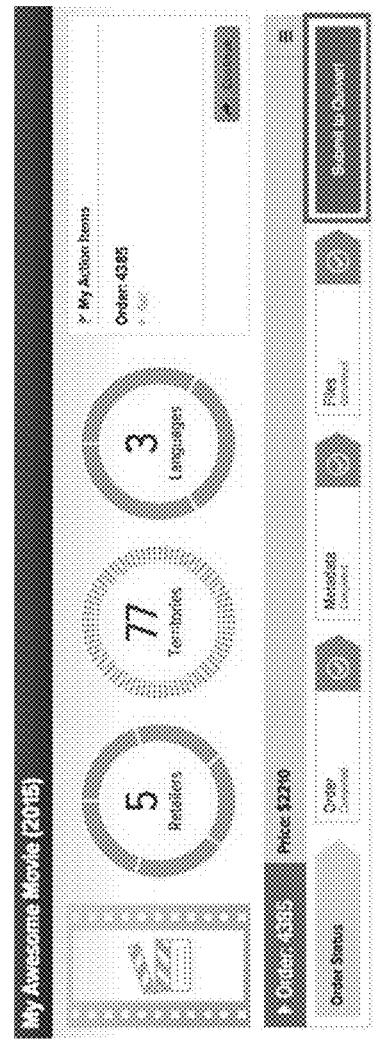
FIG. 8 illustrates a graphical user interface indicating that the order is ready for submission in accordance with one or more embodiments of the invention.

As an alternative, the user can opt to ship the files (e.g., via disk, hard drive, USB, etc.) to the service. Once all files have been uploaded/received, and all metadata has been entered, the user may submit the order to the server application (of embodiments of the invention—referred to herein as "Quiver") for actual distribution based on the user's selections. FIG. 8 illustrates a graphical user interface indicating that the order is ready for submission in accordance with one or more embodiments of the invention.

Server Application

As described above, the server 206 may maintain (e.g., in database 216) a rule set for the various rules/requirements associated with each platform/retailer 218. Numerous user interfaces may present server administrators with the ability to edit the settings/rule set associated with each platform/retailer. For example, an administrator may have the ability to indicate/update the type of content that AMAZON supports (e.g., feature, short, and the countries/territories available for each type of content) and or whether a pitch is required by the platform/retailer. Such information may be presented in a tabular/table format such that the administrator can easily modify a cell in a particular row/column to reflect An administrator may also be provided with the ability to manage the title field list. Such management includes the ability to create and manage retailer/platform specific (or generic) fields to be used by a retailer/platform. For example, the administrator can define and edit the criteria for a field such as the language used, whether it can be exported, etc. and then assign that field to a retailer (or maintain the field as a generic field).

Asset requirements as well as the assets themselves (e.g., that have been uploaded by one or more users) can also be managed by an administrator. For asset requirements, filters and basic details for each asset (e.g., asset type, text on the site, name, operation, etc.) may be managed by an administrator. The administrator may also manage the fields required by a particular platform (e.g., by viewing all fields for a specific platform/retailer).

The financials for particular assets may be tracked by territory(ies), platform/retailer, language, user, etc.

Further to the above, a user interface may be available for an administrator to map a field (e.g., a generic field) to a field for a new platform (i.e., a platform being added to the distribution capabilities. Such a capability allows new platforms to be mapped to the server system (of embodiments of the invention) without extensive programming. In other words, when adding a new platform, a user may simply specify which fields in the system (of embodiments of the invention) correspond to the fields in the new platform. Thereafter, a simple API (application programming interface) provided by the new platform may be used to enable selection and use of the new platform as a new asset distribution channel.

As described above, the server 206 maintains the metadata and other information utilized by platforms/retailers 218 in database 216. Thereafter, to actually initiate an order with the distribution platforms/retailers 218, server 206 utilizes/interacts with an API of platforms/retailers 218. Such APIs are used by the server 206 to place orders with various platforms/retailers 218 for distribution of a media content asset. As described above, open retailers are retailers 218 that accept any title as long as the files associated with that title meet the retailer's specifications. In addition, based on the information maintained in database 216, server 206 may also submit and/or "pitch" a submission to a platform/retailer 218 if desired/required. In this regard, pitches are made to curated retailers that are defined as retailers 218 that have the right to refuse any title. To deliver a title to a curated retailer, the title must first be "pitched" to and vetted by both the server of embodiments of the invention as well as the retailer 218. Embodiments of the invention will automatically create and submit an order for both an open retailer and/or a curated retailer based on the information/metadata maintained by server 206.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In view of the above, embodiments of the invention provide the ability to automate the distribution of a media content asset across multiple platforms/retailers 218 in a dynamic and smart manner. The metadata information and the information used to populate/instantiate required fields may be determined in an automated manner based on prior selections by the user. Based on the smart information, embodiments of the invention allow the user to determine which territories and/or platforms/retailers 218 an order can be placed in (for the user's content/asset) prior to actually placing an order. In contrast, prior art systems provide no capability to identify territories/platforms that are possible based on the current assets/files in the user's possession. Further, embodiments of the invention provide the additional capability to suggest the creation of a particular asset/file, the cost associated with such a creation, and the territories/platforms that would be available based on such a creation. In this regard, users have the ability to determine if the addition of a particular file (e.g., a subtitle file) (and the cost associated with creation of such a file) may allow entry into a significantly larger number of territories (e.g., double the number of territories as such territories may require a subtitle file).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for distributing media content comprising:
   acquiring, into a computer database, title information for a media asset;
   maintaining in the computer database, distribution requirements for one or more retailers and one or more territories, wherein the distribution requirements comprise one or more file requirements for one or more files required to distribute the media asset;
   selecting one or more desired retailers from the one or more retailers;
   based on the title information and the one or more desired retailers, automatically selecting one or more territories with distribution requirements that match the title information, wherein the title information comprises an original spoken language of the media asset;
   displaying the one or more file requirements for the selected one or more desired retailers and the selected one or more territories, wherein the displaying the file requirements comprises interactively indicating whether one or more of the one or more files is available, is not available, or should be automatically created including displaying a cost associated with a creation of the one or more files;
   creating an order, wherein the creating is based on the title information, the selected one or more desired retailers, the selected one or more territories, and the one or more file requirements, wherein the title information comprises one or more languages of the one or more files that are to be included in the order, and wherein the automatically selecting the one or more territories comprises selecting the one or more territories with language requirements that match the one or more languages of the one or more files that are to be included in the order;
   receiving the one or more files identified by the one or more file requirements; and
   based on the order, automatically submitting the one or more received files for distribution of the media asset via the selected one or more retailers in the one or more territories.

2. The computer-implemented method of claim 1, wherein the title information comprises a title, runtime information, and a release year of the media asset.

3. The computer-implemented method of claim 1, further comprising:
   interactively and iteratively adding an additional language; and
   automatically selecting additional territories with language requirements that match the additional language.

4. The computer-implemented method of claim 1, wherein the automatically selecting the one or more territories further comprises a date tool comprising:
   receiving date information for sales and/or rental of the media asset; and
   automatically applying the date information to all of the one or more territories.

5. The computer-implemented method of claim 1, further comprising:
   determining that one territory of the one or more territories should be removed;
   automatically removing the determined one territory and the one or more files that correspond to only the determined one territory.

6. The computer-implemented method of claim 1, further comprising a pricing tool comprising:
   selecting a currency;
   selecting retail pricing information; and
   based on the currency, automatically and dynamically converting the selected retail pricing information into all other currencies required by the selected one or more territories.

7. The computer-implemented method of claim 1, further comprising a ratings tool comprising:
   accepting ratings information for the media asset; and
   based on the accepted rating information instantiating retailer fields with the ratings information for all of one or more desired retailers that require the ratings information.

8. The computer-implemented method of claim 1, further comprising:
   displaying a summary of the selected one or more desired retailers, selected one or more territories, and the one or more file requirements; and
   reviewing and confirming the summary.

9. The computer-implemented method of claim 1, further comprising:
   automatically dynamically compiling a single contract agreement that includes provisions for each of the selected one or more desired retailers; and
   interactively confirming agreement with the single contract.

10. A computer system for distributing media content comprising:
    (a) a computer;
    (b) a computer database, executing on the computer, comprising distribution requirements for one or more retailers and one or more territories, wherein the distribution requirements comprise one or more file requirements for one or more files required to distribute the media asset;
    (c) a server application, executing on the computer and communicatively coupled to the database that:
       (1) acquires title information for a media asset;
       (2) selects one or more desired retailers from the one or more retailers;
       (3) based on the title information and the one or more desired retailers, automatically selects one or more territories with distribution requirements that match the title information, wherein the title information comprises an original spoken language of the media asset;
       (4) displays, on a display device, the one or more file requirements for the selected one or more desired retailers and the selected one or more territories, wherein the displaying the file requirements comprises interactively indicating whether one or more of the one or more files is available, is not available, or should be automatically created including displaying a cost associated with a creation of the one or more files;
       (5) creates an order, wherein the creating is based on the title information, the selected one or more desired retailers, the selected one or more territories, and the one or more file requirements, wherein the title information comprises one or more languages of the one or more files that are to be included in the order, and wherein the server application automatically selects the one or more territories by selecting the one or more territories with language requirements that match the one or more languages of the one or more files that are to be included in the order;

(6) receives the one or more files identified by the one or more file requirements and stores the received one or more files in the database; and (7) based on the order, automatically submits the one or more received files for distribution of the media asset via the selected one or more retailers in the one or more territories.

11. The computer system of claim 10, wherein the title information comprises a title, runtime information, and a release year of the media asset.

12. The computer system of claim 10, where in the server application further:
interactively and iteratively adds an additional language; and
automatically selects additional territories with language requirements that match the additional language.

13. The computer system of claim 10, wherein the server application automatically selects the one or more territories utilizing a date tool that:
receives date information for sales and/or rental of the media asset; and
automatically applies the date information to all of the one or more territories.

14. The computer system of claim 10, wherein the server application further:
determines that one territory of the one or more territories should be removed;
automatically removes the determined one territory and the one or more files that correspond to only the determined one territory.

15. The computer system of claim 10, wherein the server application further comprises a pricing tool that:
selects a currency;
selects retail pricing information; and
based on the currency, automatically and dynamically converting the selected retail pricing information into all other currencies required by the selected one or more territories.

16. The computer system of claim 10, wherein the server application further comprises a ratings tool that:
accepts ratings information for the media asset; and
based on the accepted rating information instantiates retailer fields with the ratings information for all of one or more desired retailers that require the ratings information.

17. The computer system of claim 10, wherein the server application further:
displays a summary of the selected one or more desired retailers, selected one or more territories, and the one or more file requirements; and
reviews and confirms the summary.

18. The computer system of claim 10, wherein the server application further:
automatically dynamically compiles a single contract agreement that includes provisions for each of the selected one or more desired retailers; and
interactively confirms agreement with the single contract.

* * * * *